(12) United States Patent
Yao et al.

(10) Patent No.: US 10,667,266 B2
(45) Date of Patent: May 26, 2020

(54) RESOURCE INDICATION FOR BANDWIDTH ALLOCATION IN WIRELESS COMMUNICATION

(71) Applicant: Nokia Technologies Oy, Espoo (FI)

(72) Inventors: Chunhai Yao, Beijing (CN); Yuantao Zhang, Beijing (CN); Rapeepat Ratasuk, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/324,641

(22) PCT Filed: Aug. 12, 2016

(86) PCT No.: PCT/CN2016/094981
§ 371 (c)(1),
(2) Date: Feb. 11, 2019

(87) PCT Pub. No.: WO2018/027945
PCT Pub. Date: Feb. 15, 2018

(65) Prior Publication Data
US 2019/0182837 A1    Jun. 13, 2019

(51) Int. Cl.
*H04W 72/04* (2009.01)

(52) U.S. Cl.
CPC ....... *H04W 72/0453* (2013.01); *H04W 72/04* (2013.01); *H04W 72/044* (2013.01)

(58) Field of Classification Search
CPC .................................................. H04W 72/04; H04W 72/044; H04W 72/0453
See application file for complete search history.

(56) References Cited

U.S. PATENT DOCUMENTS

| 2015/0009939 A1* | 1/2015 | Zhang | H04W 72/1289 370/329 |
|---|---|---|---|
| 2016/0128055 A1 | 5/2016 | Xiong et al. | |
| 2018/0049176 A1* | 2/2018 | Park | H04L 5/0092 |

(Continued)

FOREIGN PATENT DOCUMENTS

| CN | 104380805 A | 2/2015 |
|---|---|---|
| CN | 104380820 A | 2/2015 |

(Continued)

OTHER PUBLICATIONS

International Search Report and Written Opinion received for corresponding Patent Cooperation Treaty Application No. PCT/CN2016/094981, dated Apr. 21, 2017, 12 pages.

*Primary Examiner* — Gary Mui
(74) *Attorney, Agent, or Firm* — Nokia Technologies Oy

(57) ABSTRACT

Various communication systems may benefit from appropriate configuration of available bandwidth. These and other communication systems, such as wireless communication systems, may benefit from resource indication for a larger channel bandwidth. One example is further enhanced machine type communication. A method can include determining, by a radio network node, a bandwidth for allocation to a user equipment. The allocated bandwidth can include resources in a single narrowband or a plurality of narrowbands. The method can also include indicating to the user equipment the single narrowband or the plurality of narrowbands and allocated resources in the single narrowband or the plurality of narrowbands.

20 Claims, 8 Drawing Sheets

(56) References Cited

U.S. PATENT DOCUMENTS

| | | | | |
|---|---|---|---|---|
| 2018/0220404 A1* | 8/2018 | Awad | ............... | H04W 4/70 |
| 2018/0248668 A1* | 8/2018 | Hwang | ............... | H04W 4/00 |
| 2019/0288814 A1* | 9/2019 | Horiuchi | ............... | H04L 5/0048 |

FOREIGN PATENT DOCUMENTS

| | | |
|---|---|---|
| CN | 105610556 A | 5/2016 |
| WO | 2016064837 A1 | 4/2016 |

\* cited by examiner

| State | Solution 2 – Option 1 | | | | Solution 2 – Option2 | | | |
|---|---|---|---|---|---|---|---|---|
| | Starting PRB in Starting NB | Ending PRB in Starting NB | Starting NB | Ending NB | Starting PRB in Starting NB | Ending PRB in Starting NB | Starting NB | Ending NB |
| 1 | 1 | 1 | 2 | 2 | 1 | 6 | 2 | 2 |
| 2 | 1 | 2 | 2 | 2 | 2 | 6 | 2 | 2 |
| 3 | 1 | 3 | 2 | 2 | 3 | 6 | 2 | 2 |
| 4 | 1 | 4 | 2 | 2 | 4 | 6 | 2 | 2 |
| 5 | 1 | 5 | 2 | 2 | 5 | 6 | 2 | 2 |
| 6 | 1 | 6 | 2 | 2 | 6 | 6 | 2 | 2 |
| 7 | 2 | 2 | 2 | 2 | 1 | 6 | 2 | 3 |
| 8 | 2 | 3 | 2 | 2 | 2 | 6 | 2 | 3 |
| 9 | 2 | 4 | 2 | 2 | 3 | 6 | 2 | 3 |
| 10 | 2 | 5 | 2 | 2 | 4 | 6 | 2 | 3 |
| 11 | 2 | 6 | 2 | 2 | 5 | 6 | 2 | 3 |
| 12 | 3 | 3 | 2 | 2 | 6 | 6 | 2 | 3 |
| 13 | 3 | 4 | 2 | 2 | 1 | 6 | 2 | 4 |
| 14 | 3 | 5 | 2 | 2 | 2 | 6 | 2 | 4 |
| 15 | 3 | 6 | 2 | 2 | 3 | 6 | 2 | 4 |
| 16 | 4 | 4 | 2 | 2 | 4 | 6 | 2 | 4 |
| 17 | 4 | 5 | 2 | 2 | 5 | 6 | 2 | 4 |
| 18 | 4 | 6 | 2 | 2 | 6 | 6 | 2 | 4 |
| 19 | 5 | 5 | 2 | 2 | 1 | 6 | 2 | 5 |
| 20 | 5 | 6 | 2 | 2 | 2 | 6 | 2 | 5 |
| 21 | 6 | 6 | 2 | 2 | 3 | 6 | 2 | 5 |
| 22 | 1 | 6 | 2 | 3 | 4 | 6 | 2 | 5 |
| 23 | 2 | 6 | 2 | 3 | 5 | 6 | 2 | 5 |
| 24 | 3 | 6 | 2 | 3 | 6 | 6 | 2 | 5 |
| 25 | 4 | 6 | 2 | 3 | 1 | 6 | 2 | 6 |
| 26 | 5 | 6 | 2 | 3 | 2 | 6 | 2 | 6 |
| 27 | 6 | 6 | 2 | 3 | 3 | 6 | 2 | 6 |
| 28 | 1 | 6 | 2 | 4 | 4 | 6 | 2 | 6 |
| 29 | 2 | 6 | 2 | 4 | 5 | 6 | 2 | 6 |
| 30 | 3 | 6 | 2 | 4 | 6 | 6 | 2 | 6 |
| 31 | 4 | 6 | 2 | 4 | | | | |
| 32 | 5 | 6 | 2 | 4 | | | | |

Table 1

Figure 4

Table 2A

| State | Solution2, optimized Option 2 | | | |
|---|---|---|---|---|
| | Starting PRB in Starting NB | Ending PRB in Starting NB | Starting NB | Ending NB |
| 1 | 1 | 1 | 2 | 2 |
| 2 | 1 | 2 | 2 | 2 |
| 3 | 1 | 3 | 2 | 2 |
| 4 | 1 | 4 | 2 | 2 |
| 5 | 1 | 5 | 2 | 2 |
| 6 | 2 | 2 | 2 | 2 |
| 7 | 2 | 3 | 2 | 2 |
| 8 | 2 | 4 | 2 | 2 |
| 9 | 2 | 5 | 2 | 2 |
| 10 | 2 | 6 | 2 | 2 |
| 11 | 3 | 3 | 2 | 2 |
| 12 | 3 | 4 | 2 | 2 |
| 13 | 3 | 5 | 2 | 2 |
| 14 | 3 | 6 | 2 | 2 |
| 15 | 4 | 4 | 2 | 2 |
| 16 | 4 | 5 | 2 | 2 |
| 17 | 4 | 6 | 2 | 2 |
| 18 | 5 | 5 | 2 | 2 |
| 19 | 5 | 6 | 2 | 2 |
| 20 | 6 | 6 | 2 | 2 |
| 21 | 1 | 6 | 2 | 3 |
| 22 | 2 | 6 | 2 | 3 |
| 23 | 3 | 6 | 2 | 3 |
| 24 | 4 | 6 | 2 | 3 |
| 25 | 5 | 6 | 2 | 3 |
| 26 | 6 | 6 | 2 | 3 |
| 27 | | | | |

Table 2B

| State | Solution2, optimized Option 2 | | | |
|---|---|---|---|---|
| | Starting PRB in Starting NB | Ending PRB in Starting NB | Starting NB | Ending NB |
| 1 | 1 | 1 | 1 | 1 |
| 2 | 1 | 2 | 1 | 1 |
| 3 | 1 | 3 | 1 | 1 |
| 4 | 1 | 4 | 1 | 1 |
| 5 | 1 | 5 | 1 | 1 |
| 6 | 1 | 6 | 1 | 1 |
| 7 | 2 | 2 | 1 | 1 |
| 8 | 2 | 3 | 1 | 1 |
| 9 | 2 | 4 | 1 | 1 |
| 10 | 2 | 5 | 1 | 1 |
| 11 | 2 | 6 | 1 | 1 |
| 12 | 3 | 3 | 1 | 1 |
| 13 | 3 | 4 | 1 | 1 |
| 14 | 3 | 5 | 1 | 1 |
| 15 | 3 | 6 | 1 | 1 |
| 16 | 4 | 4 | 1 | 1 |
| 17 | 4 | 5 | 1 | 1 |
| 18 | 4 | 6 | 1 | 1 |
| 19 | 5 | 5 | 1 | 1 |
| 20 | 5 | 6 | 1 | 1 |
| 21 | 6 | 6 | 1 | 1 |
| 22 | 1 | 2 | 1 | 3 |
| 23 | 2 | 3 | 1 | 3 |
| 24 | 3 | 4 | 1 | 3 |
| 25 | 4 | 5 | 1 | 3 |
| 26 | 5 | 6 | 1 | 3 |
| 27 | 6 | 6 | 1 | 3 |

Figure 5

| System bandwidth | PRB number | NB number | Required bits for method 1 (Rel.8) | Required bits for Solution 1 | Required bits for Solution 2 |
|---|---|---|---|---|---|
| 3MHz | 15 | 2 | 7 | 5 | 6 |
| 5MHz | 25 | 4 | 9 | 7 | 7 |
| 10MHz | 50 | 8 | 11 | 9 | 8 |
| 15MHz | 75 | 12 | 12 | 10 | 9 |
| 20MHz | 100 | 16 | 13 | 11 | 9 |

Table 3

Figure 6

RESOURCE INDICATION FOR BANDWIDTH ALLOCATION IN WIRELESS COMMUNICATION

RELATED APPLICATION

This application was originally filed as Patent Cooperation Treaty Application No. PCT/CN2016/094981 filed Aug. 12, 2016.

BACKGROUND

Field

Various communication systems may benefit from appropriate configuration of available bandwidth. These and other communication systems, such as wireless communication systems, may benefit from resource indication for a larger channel bandwidth. One example is further enhanced machine type communication (MTC).

DESCRIPTION OF THE RELATED ART

The Work Item (WI), "Further enhanced MTC," aims to improve enhanced machine type communication (eMTC) user equipment (UE) data rate. With respect to higher data rates [RAN1, RAN2, RAN4], there may be hybrid automatic repeat request acknowledgment (HARQ-ACK) bundling in coverage enhancement (CE) mode A in half duplex frequency division duplex (HD-FDD), a larger maximum data rate, and a larger maximum physical downlink shared channel/physical uplink shared channel (PDSCH/PUSCH) channel bandwidth in connected mode at least in CE mode A in order to enhance support for, for example, voice and audio streaming or other applications and scenarios. There may be up to 10 downlink (DL) HARQ processes in CE mode A in FD-FDD.

In release 13 (Rel.13), a bandwidth-reduced low-complexity or coverage enhanced (BL/CE) eMTC UE only supports 6 physical resource block (PRB) baseband and radio frequency (RF) bandwidth, which limit the UL and DL peak data rate. With the new WI, further enhanced MTC UE would support larger channel bandwidth in both UL and DL, such that the UE data rate would increase with the support of the larger channel bandwidth.

For UL and DL data channel, the Rel.13 eMTC resource allocation method could not be reused, as the resource block assignment field in downlink control information (DCI) is for 6 PRB. Therefore, new solutions are needed for resource indication for an MTC UE, where the channel bandwidth may be larger than 6 PRB but smaller than the system bandwidth.

SUMMARY

The invention is defined by the independent claims. Some embodiments are defined by the dependent claims.

According to certain embodiments, a method can include determining, by a radio network node, a bandwidth for allocation to a user equipment. The allocated bandwidth can include resources in a single narrowband or a plurality of narrowbands. The method can also include indicating to the user equipment the single narrowband or the plurality of narrowbands and allocated resources (for example, a number of PRBs) in the single narrowband or the plurality of narrowbands. The user equipment can include a machine type communication user equipment supporting larger than one narrowband allocation.

In certain embodiments, a method can include receiving, from a radio network node, an indication of a bandwidth allocated to a user equipment. The allocated bandwidth can include resources in a single narrowband or a plurality of narrowbands. The indication may indicate the single narrowband or the plurality of narrowbands and allocated resources in the single narrowband or the plurality of narrowbands. The method can also include communicating, by the user equipment, in accordance with the indication of allocated bandwidth. The user equipment can include a machine type communication user equipment supporting larger than one narrowband allocation.

An apparatus, according to certain embodiments, can include at least one processor and at least one memory including computer program code. The at least one memory and the computer program code can be configured to, with the at least one processor, cause the apparatus at least to determine, by a radio network node, a bandwidth for allocation to a user equipment. The allocated bandwidth can include resources in a single narrowband or a plurality of narrowbands. The at least one memory and the computer program code can also be configured to, with the at least one processor, cause the apparatus at least to indicate to the user equipment the single narrowband or the plurality of narrowbands and allocated resources in the single narrowband or the plurality of narrowbands. The user equipment can include a machine type communication user equipment supporting larger than one narrowband allocation.

An apparatus, in certain embodiments, can include at least one processor and at least one memory including computer program code. The at least one memory and the computer program code can be configured to, with the at least one processor, cause the apparatus at least to receive, from a radio network node, an indication of a bandwidth allocated to a user equipment. The allocated bandwidth can include resources in a single narrowband or a plurality of narrowbands. The indication may indicate the single narrowband or the plurality of narrowbands and allocated resources in the single narrowband or the plurality of narrowbands. The at least one memory and the computer program code can also be configured to, with the at least one processor, cause the apparatus at least to communicate, by the user equipment, in accordance with the indication of allocated bandwidth. The user equipment can include a machine type communication user equipment supporting larger than one narrowband allocation.

According to certain embodiments, an apparatus can include means for determining, by a radio network node, a bandwidth for allocation to a user equipment. The allocated bandwidth can include resources in a single narrowband or a plurality of narrowbands. The apparatus also includes means for indicating to the user equipment the single narrowband or the plurality of narrowbands and allocated resources in the single narrowband or the plurality of narrowbands. The user equipment can include a machine type communication user equipment supporting larger than one narrowband allocation.

In certain embodiments, an apparatus can include means for receiving, from a radio network node, an indication of a bandwidth allocated to a user equipment. The allocated bandwidth can include resources in a single narrowband or a plurality of narrowbands. The indication may indicate the single narrowband or the plurality of narrowbands and allocated resources in the single narrowband or the plurality of narrowbands. The apparatus can also include means for communicating, by the user equipment, in accordance with the indication of allocated bandwidth. The user equipment can include a machine type communication user equipment supporting larger than one narrowband allocation.

A computer program product can, according to certain embodiments, encode instructions for performing a process. The process can include determining, by a radio network node, a bandwidth for allocation to a user equipment. The allocated bandwidth can include resources in a single narrowband or a plurality of narrowbands. The process can also include indicating to the user equipment the single narrowband or the plurality of narrowbands and allocated resources in the single narrowband or the plurality of narrowbands. The user equipment can include a machine type communication user equipment supporting larger than one narrowband allocation.

A computer program product can, in certain embodiments, encode instructions for performing a process. The process can include receiving, from a radio network node, an indication of a bandwidth allocated to a user equipment. The allocated bandwidth can include resources in a single narrowband or a plurality of narrowbands. The indication may indicate the single narrowband or the plurality of narrowbands and allocated resources in the single narrowband or the plurality of narrowbands. The process can also include means for communicating, by the user equipment, in accordance with the indication of allocated bandwidth. The user equipment can include a machine type communication user equipment supporting larger than one narrowband allocation.

A non-transitory computer-readable medium can, in certain embodiments, encode instructions that, when executed in hardware, perform a process. The process can include any of the above-mentioned methods.

BRIEF DESCRIPTION OF THE DRAWINGS

For proper understanding of the invention, reference should be made to the accompanying drawings, wherein:

FIG. 4 illustrates Table 1, which provides example mapping tables for a second solution, according to certain embodiments.

FIG. 5 illustrates Table 2A and Table 2B, which provides a mapping table for 1NB and 2NB allocation and respectively a mapping table for 1NB and 3NB allocation, according to certain embodiments.

FIG. 6 illustrates Table 3, provides a comparison of used bits among different solutions, according to certain embodiments.

DETAILED DESCRIPTION

Figure 1:
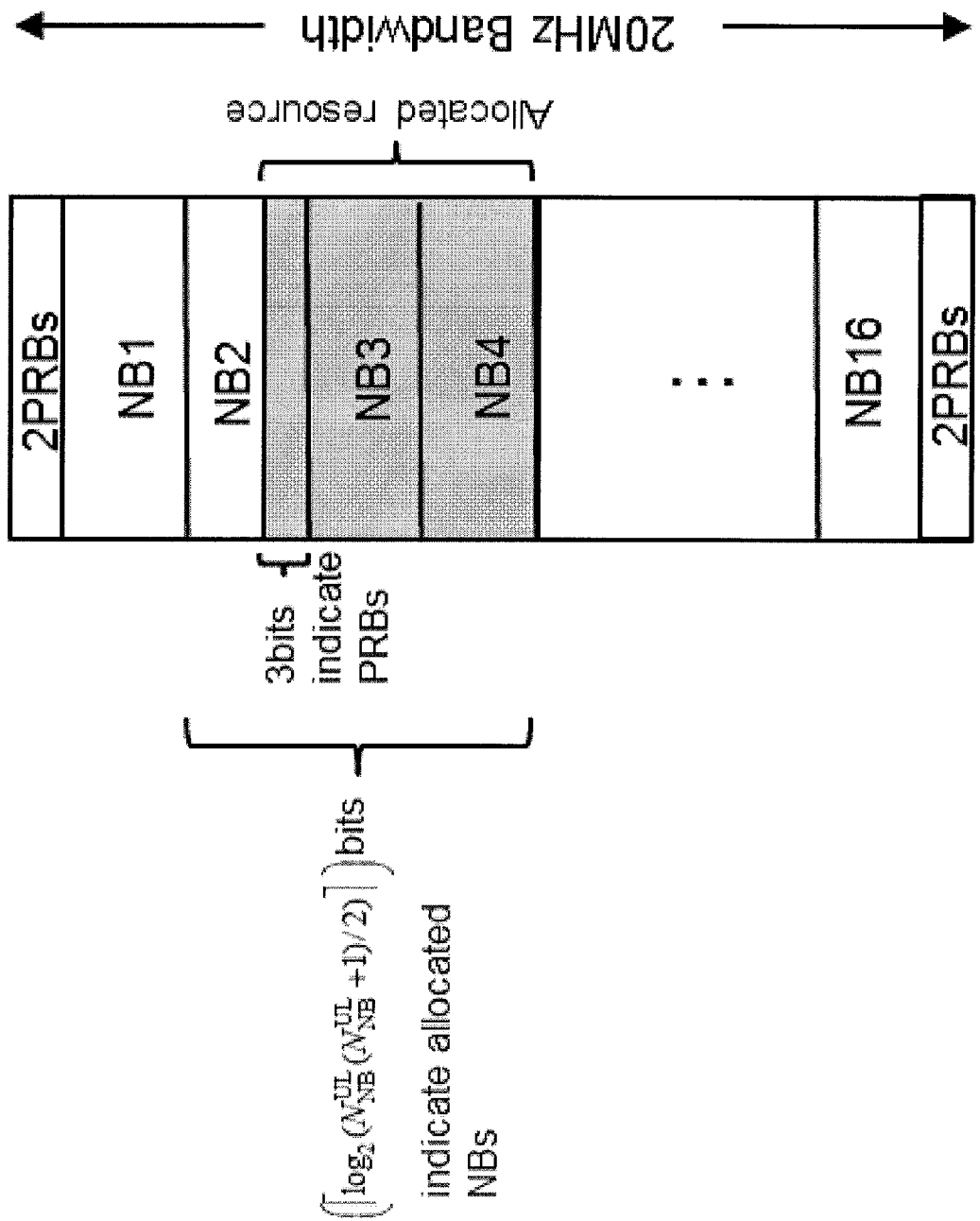
FIG. 1 illustrates an example of a first solution, according to certain embodiments.

If the FeMTC UE's supported channel bandwidth is larger than 6 physical resource blocks (PRB), the downlink (DL) control channel and data channel could be impacted, compared with Rel.13 eMTC. For the DL control channel, MTC physical downlink control channel (PDCCH) (MPDCCH), if a larger MPDCCH bandwidth (>6PRB) is allowed, the MPDCCH resources could not be shared between a Rel.13 eMTC UE and a Rel.14 further enhanced MTC UE. Besides, a new MPDCCH design would be required in terms of higher aggregation level, redefined repetition level, and so on.

For uplink (UL) and DL data channel, the Rel.13 eMTC resource allocation method may not be reusable, as the resource block assignment field in DCI is for 6 PRB in Rel 13. Certain embodiments may provide a solution for the case of resource allocation larger than 6 PRB.

Certain embodiments provide at least two solutions for resource allocation for larger channel bandwidth, where UE has the capability to supporting more than 6PRBs. The baseline of the invention is that FeMTC reuses the narrow band definition, i.e., one narrow band contains 6PRBs. The UE that is to be allocated with resources can operate with narrowbands under MTC restrictions.

Solution 1 can provide resource allocation based on narrowband as a minimum unit. In one embodiment, the allocated narrowbands can be indicated along with the PRB resources in narrowband with a lowest index, and only the PRB resources continuous with other narrowbands may be indicated, such that it only needs 3 bits. The indication of allocated narrowbands need $\log_2[N(N+1)/2]$ bits. The total required bits in this solution can be calculated as follows: $\log_2[N(N+1)/2]+3$, where N is the number of narrowbands (NB) in system bandwidth and log denotes $\log_2( )$.

Solution 2 can re-interpret the 5-bit eMTC resource indication field in downlink control information (DCI). The starting and/or ending narrowband can be indicated with $\log_2[M/6]$ bit, where M is number of PRBs in system bandwidth. 21 states of the 5 bits eMTC resource indication field can be used to indicate the PRB(s) within the ending or starting narrowband. The remaining 11 states of the 32 states (5 bits→32 states) can be used to indicate allocation in narrowbands adjacent to the ending or starting narrowband. The total required bits can be $\log_2[M/6]+5$. In another option for this solution, a mapping table may be used to show the relationship between the stated of the 5 bits and NB/PRB combinations.

These solutions can provide an indication of bandwidth with fewer bits than Rel.8 resource allocation approach. Thus, these may be useful and beneficial solutions for resource allocation for larger channel bandwidth FeMTC, in which the FeMTC UE has the capability to supporting more than 6PRB s.

In certain embodiments, FeMTC reuses the narrow band definition in eMTC, namely that one narrow band contains 6 PRBs. The example solutions can be applied to both UL and DL resource allocation, for example the solutions can be applied to MPUSCH and MPDSCH resource allocation.

In solution 1, resource allocation can be based on narrowband as the minimum unit. Allocated narrowbands can be indicated using ($\lceil \log_2(N_{NB}^{UL}(N_{NB}^{UL}+1)/2] \rceil$) bits to indicate the allocated narrowbands. Moreover, the PRBs resources in narrowband with lowest or highest index can be indicated, and only the PRB resources continuous with other narrowbands may be indicated. Thus, for these purposes 3 bits can be used. Since one NB comprises 6 PRBs, three bits is more than sufficient to indicate any of the six combinations of 1-6, 2-6, 3-6, 4-6, 5-6, and 6-6 PRBs. All 6 PRBs in other indicated narrowband(s) can be used for MPDSCH/MPUSCH transmission. Thus, certain embodiments employing solution 1 may use a total of ($\lceil \log_2(N_{NB}^{UL}(N_{NB}^{UL}+1)/2] \rceil$)+3 bits.

In solution 2, a predefined resource indication field can be reinterpreted for resource indication purposes for FeMTC. For example, the predefined resource indication field may comprise five bits in an eMTC resource indication field. The field may be reinterpreted so that the 5 bits provide the resource allocation using UL resource allocation type 0 (which is a method of continuous resource allocation) within the indicated narrowband. This solution may allow existing downlink control information (DCI) formats to be re-used, thus avoiding the need to introduce new formats.

Certain embodiments employing solution 2 can use $$\left\lceil \log_2 \left\lfloor \frac{N_{RB}^{UL}}{6} \right\rfloor \right\rceil$$

bits to indicate the starting and/or ending narrowband. Moreover, the 5 bits in the eMTC resource indication field can be reinterpreted to indicate the PRB and/or NB allocations.

According to a first option of solution 2, a definition of 21 states from the eMTC resource indication field can be reused to indicate the PRB allocation within the ending or starting narrowband. The remaining 11 states can be used to indicate allocation in narrowbands adjacent to the ending or starting narrowband. The adjacent narrowbands may apply full 6 PRB allocation, while the PRB targeted with the 21 states may apply partial PRB allocation. In case only PRBs in one NB are allocated, then the PRBs may be also in the middle of the NB (e.g. PRBs 4-5 of the six PRBs in one NB).

According to a second option of solution 2 a new table mapping can be used. Different tables may be used based on the maximum number of PRBs that can be allocated to the UE. In certain embodiments, 6 states can be used to indicate PRBs in one allocated narrowband.

In certain embodiments according to the second solution, $$\left\lceil \log_2 \left\lfloor \frac{N_{RB}^{UL}}{6} \right\rfloor \right\rceil + 5$$

bits may be used. This may be true with respect to either of the two options of solution 2.

The resource allocation solutions can be applied to both UL and DL. For a 20 MHz system bandwidth, there are 100 PRBs and 16 narrowbands (16*6 PRBs<100 PRBs). For an FeMTC UE, if it supports 3 narrowbands (i.e., 18 PRBs) channel bandwidth and the UE is allocated with 14PRBs, it would occupy 2 and ⅓ narrowbands.

FIG. 1 illustrates an example of a first solution, according to certain embodiments. In the illustration of solution 1 provided in FIG. 1, three bits can indicate the occupied 2 PRBs of narrowband 2. It needs to be noted that the starting narrowband is relying on scheduling, and it could be a narrowband other than narrowband 2, which is used here only as an example. Because the resource allocation is continuous and adjacent to other narrowbands, only PRB index combination {6}, {5, 6}, {4, 5, 6}, {3, 4, 5, 6}, {2, 3, 4, 5, 6}, {1, 2, 3, 4, 5, 6} in narrowband 2 need to be indicated, PRB with index{5, 6} is indicated in this example, thus 3 bits is enough (i.e. with three bits one can indicate up to 8 states, here 6 states is enough). It may be noted that the partially allocated NB (=NB2) has the lowest index among the allocated NBs (=NBs 2, 3, and 4). Moreover, ($\lceil \log_2$ ($N_{NB}^{UL}(N_{NB}^{UL}+1)/2\rceil$) bits can indicate the total allocated narrowbands, for example, NBs 2, 3, 4 in FIG. 1.

Figure 2:
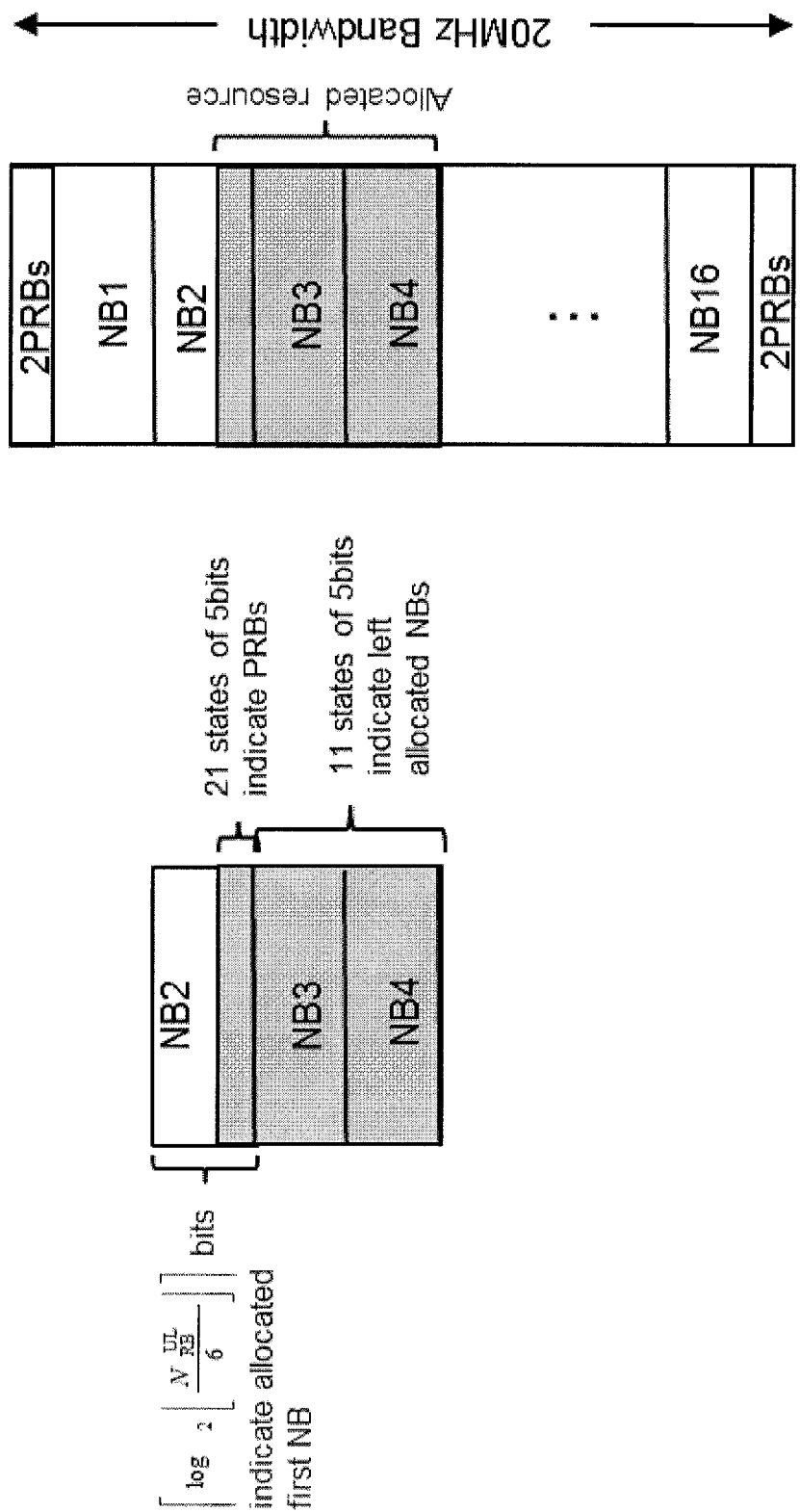
FIG. 2 illustrates an example of a first option of a second solution, according to certain embodiments.

FIG. 2 illustrates an example of a first option of a second solution, according to certain embodiments. In this example of solution 2, option 1, $$\left\lceil \log_2 \left\lfloor \frac{N_{RB}^{UL}}{6} \right\rfloor \right\rceil$$

bits can indicate the allocated first narrowband, for example, NB2 in FIG. 2. This may be the narrowband with the lowest or highest index among the allocated NBs. The 21 states of the additional 5 bits eMTC resource indication field may be re-interpreted to indicate the 2 PRBs in the first NB (=NB2). Six states may be enough to indicate each allocated narrowband. In certain embodiments, even a UE supporting larger channel bandwidth (e.g., larger than 1NB=6PRBs), and if allocated PRBs is larger than 6, then states after 21 can be used (as can be seen in FIG. 4). On the other hand, if allocated PRB is smaller than 6 PRB, non-continuous resource allocated can be applied just like Rel.13, thus the Rel.13 implementation can be reused by eNB and UE. The leftover 11 states of 5 bits can indicate the other allocated narrowbands, e.g., NBs 3, 4 in FIG. 2. This is also shown in FIG. 4, the state 32 can indicate the allocated resources in this example, i.e. the UE is allocated with PRBs 5 and 6 from NB 2 and full NBs 3 and 4. Therefore, the embodiments of the invention allow to indicate a bandwidth allocation of either all or a few PRBs within one NB, or a bandwidths allocation of more than one NB (i.e. more than 6 PRBs). The same indication format may be used for both indications. This provides flexibility for resource indication to a FeMTC UE.

Figure 3:
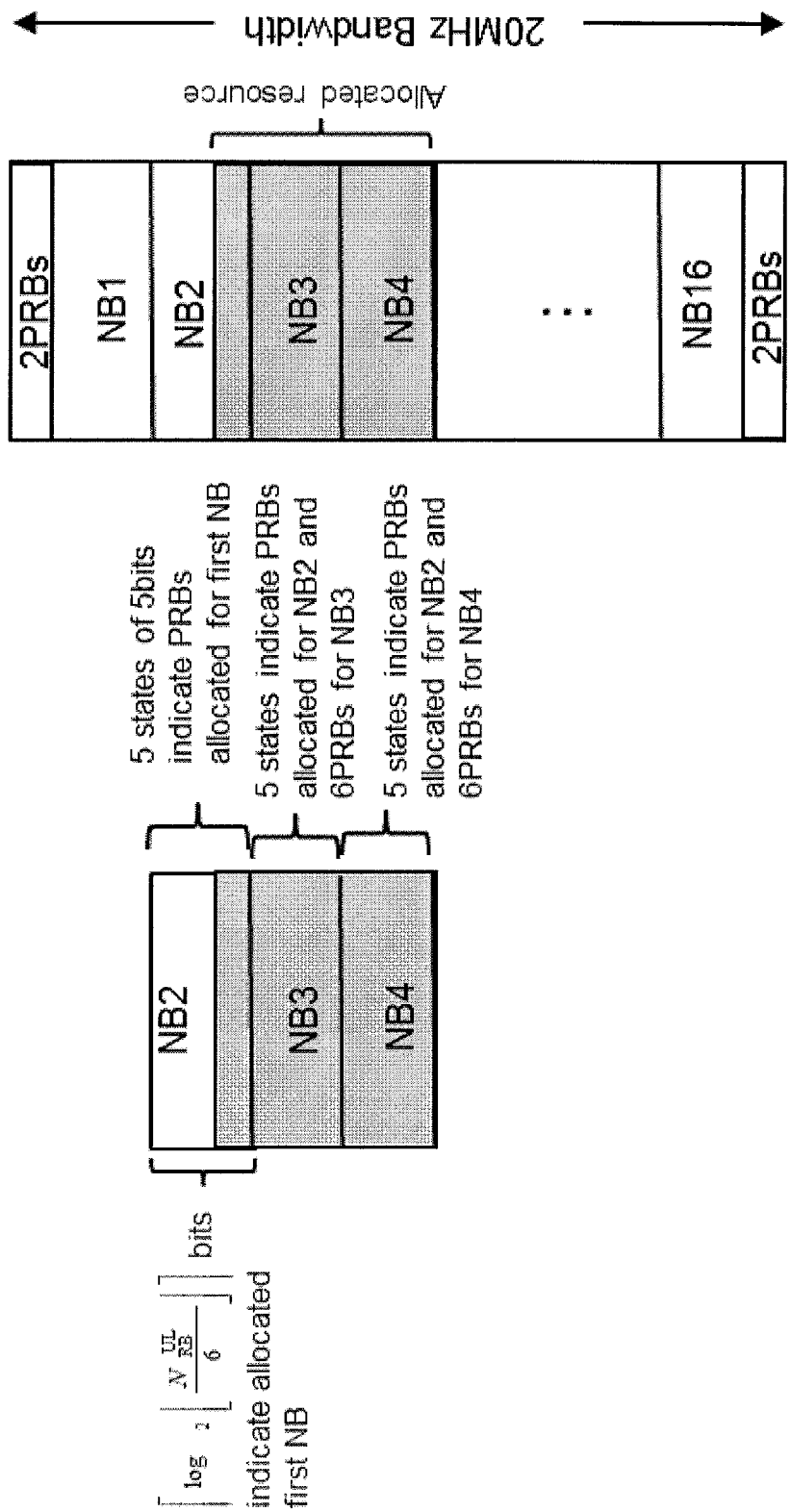
FIG. 3 illustrates an example of a second option of a second solution, according to certain embodiments.

FIG. 3 illustrates an example of a second option of a second solution, according to certain embodiments. In this example of solution 2, option 2, $$\left\lceil \log_2 \left\lfloor \frac{N_{RB}^{UL}}{6} \right\rfloor \right\rceil$$

bits can indicate the allocated first narrowband, for example NB2. Checking the state mapping table in FIG. 4, the state 17 means the starting allocated PRB is 5 in Narrowband 2, and ending at the narrowband 4.

FIG. 4 illustrates Table 1, which provides example mapping tables for the second solution, according to certain embodiments. Table 1 provides two examples of mapping tables for solution 2.

In Option 1, the full 21 states from eMTC can be maintained when only 1 narrowband is allocated. However, this example allows only 3 NBs (e.g. NBs 2-4) to be assigned. In case only one NB is allocated, then the allocated PRBs may be in the middle of the NB, e.g. PRBs 2-4 in NB 2, per state 9. However, in case more than one NB is allocated, then the PRBs in the first NB (e.g. NB 2) are adjacent to the fully allocated other NBs (e.g. NB 3, or NBs 3-4).

In Option 2, the number of states is reduced to 6 when 1 narrowband is allocated. This is possible by allocating only PRBs which are continuous to the other allocated NBs. The Table shows a scenario where the other allocated NBs are higher in index than the possible partially allocated NB2. This is why the 6 states indicate PRB combinations 1-6, 2-6, 3-6, 4-6, 5-6, and 6-6 for NB 2 (=starting NB). However, it is also possible to indicate with the 6 states also PRBs 1-1, 1-2, 1-3, 1-4, 1-5, and 1-6, for a case where the other allocated NB(s) are the NB(s) before the NB to which the six states apply (i.e. instead of referring to starting NB in the first two columns of solution 2-option 2, the columns may refer to the ending NB). The use of only six states instead of 21 states of option 1 reduces flexibility but can allow up to 6 NBs to be allocated using 5 bits.

Further optimization may be possible in Solution 2 by limiting the possible starting narrowband when different number of narrowbands can be allocated. Each NB or some of NBs can be predefined or be configured by the network as the starting (or ending) NB for a specific resource allocation. As said, there may be totally 21 states for PRB allocation within an NB for a case where only one NB is allocated with possibly partial resources. On the other hand, 6 states may be also sufficient to allow a possibility to indicate an allocation of more NBs (Sol2-Option2). Thus, to maintain 5 bits (<=32 states) resource allocation, the pre-definition and configuration can fulfil the following conditions. If an allocated NB is predefined or configured for 1NB resource allocation, this NB can serve as a starting (or ending) NB for another >1NB resource allocation, and if an allocated NB is not used for 1NB resource allocation, this NB can be used for another five >1NB resource allocation.

For instance, when a maximum number of 3 NBs can be allocated, it is possible to predefine NB 0, 1, 2, 3, 4, . . . as the starting NB for 1 NB allocation, and/or to predefine NB 0, 2, 4, 8, . . . as the starting NB for 2 NB allocation, and/or to predefine NB 1, 3, 5, . . . , as the starting NB for 3 NB allocation, and so on. Based on that, if UE gets the starting NB as the one from {0, 2, 4, 6}, the UE can know the number of NBs that is allocated to the UE is either 1NB or 2NB. The UE can use Table 2A to interpret the 5 bits allocation. If the UE gets the starting NB from the DCI as the one from {1, 3, 5}, the UE can know the number of NBs that is allocated to the UE is either 1NB or 3NB. Therefore the UE can use Table 2B to interpret the 5 bits allocation. FIG. 5 illustrates Table 2A and Table 2B, which provides a mapping table for 1NB and 2NB allocation and respectively a mapping table for 1NB and 3NB allocation, according to certain embodiments.

The predefinition or configuration can reduce the number of possible states and thus allow Solution 2, Option 1 to be efficiently used.

In a particular example, NB 0, 1, 2, 3, 4, . . . can be the starting NB for 1 NB allocation; NB 0, 2, 4, 6, . . . can be the starting NB for 2 NB allocation; and NB 1, 3, 5, . . . can be the starting NB for 3 NB allocation. Since in this example each NB can be taken as starting NB for 1NB allocation, there are 21 states occupied for the PRB indication within a NB. From e.g. Table 1, for option1, it can be seen that 21 states can be used for PRB indication for 1NB allocation. For >2NB allocation, there can be 6 states occupied for the PRB indication in the starting NB. From Table 1, for option1, it can be seen that states 22-27 can be used for PRB indication for 2NB allocation. There may be a maximum of 32 states. If 0, 3, 6 were the starting NB for 3 NB allocation, and the UE is allocated the starting NB 0, then the total of states would be 21 (for 1NB allocation)+6 (for 2NB allocation)+6 (for 3NB allocation)=33, which is larger than 32. Therefore, if an NB is predefined or configured for 1NB resource allocation, this NB can be served as an starting (or ending) NB for another one >1NB resource allocation.

FIG. 6 illustrates Table 3, provides a comparison of used bits among different solutions, according to certain embodiments. Table 3 provides a comparison of resource allocation used bits among different solutions. As the Rel.8 resource allocation method can be re-used for FeMTC, it can be the baseline for comparison. Through the table, it can be seen that the required bits of solution 1 and solution 2 are smaller than Rel.8 method for different system bandwidth, in most cases 2 or 3 bits can be saved for DCI. Comparing solution 1 and 2, for smaller system bandwidth, solution 1 is slight better than solution 2, more particularly 1 bit can be saved for 3 MHz bandwidth. For larger system bandwidth, solution 2 may save more bits than solution 1.

Although there are two different examples solutions described above, with the second solution including multiple options, these and other examples may be summarized in one or more general method.

Figure 7:
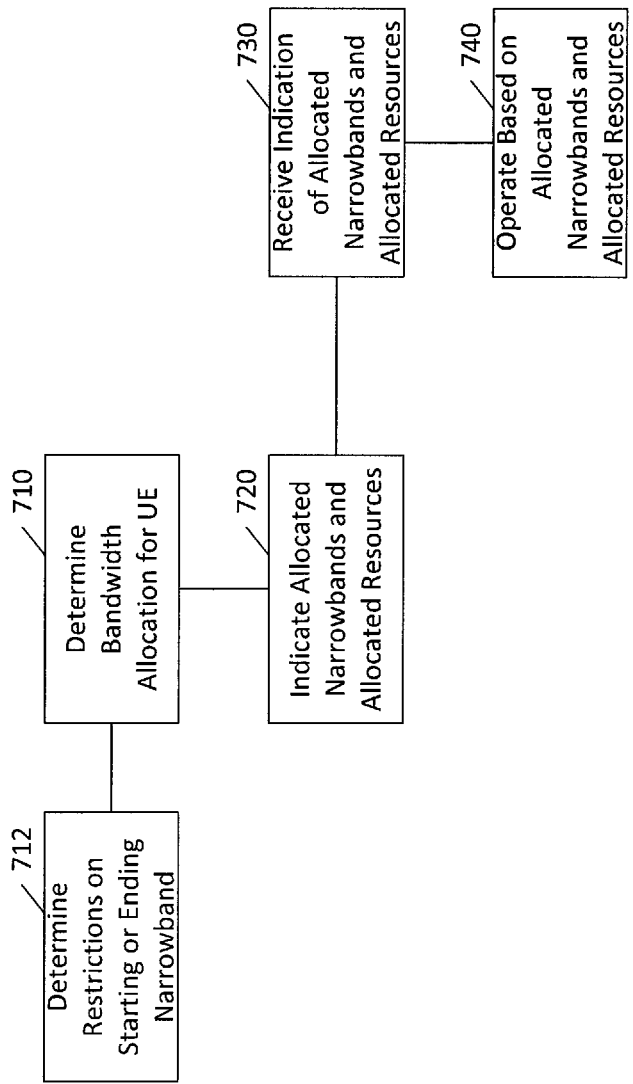
FIG. 7 illustrates a method according to certain embodiments.

FIG. 7 illustrates a method according to certain embodiments. The method can include, at 710, determining, by a radio network node, a bandwidth for allocation to a user equipment. The allocated bandwidth can a plurality of narrowbands. The method can also include, at 720, indicating to the user equipment the allocated plurality narrowbands and allocated resources in at least one of the plurality of allocated narrowbands, as described above, for example, with respect to solution 1 and solution 2.

The indicating can include generating a resource allocation message to the user equipment. The resource allocation message can be configured to enable indication of the single narrowband or the plurality of narrowbands and the allocated resources in the single narrowband or in the plurality of narrowbands. For example, the resource allocation message can be configured in such a way that the message is capable of indicating both a scenario where a single narrowband is allocated and a scenario where a plurality of narrowbands are allocated. This configuration may be accomplished, for example, by including an indicator as to whether the message relates to one or a plurality of narrowbands, or by having predetermined fields that are capable of both kinds of indication.

The method can include, at 712, determining restrictions on available starting and/or ending narrowband. The indicating at 720 can include indicating these restrictions to the user equipment. The restrictions may refer predefining NB 0, 1, 2, 3, 4, . . . as the starting NB for 1 NB allocation, and/or to predefining NB 0, 2, 4, 8, . . . as the starting NB for 2 NB allocation, and/or to predefining NB 1, 3, 5, . . . , as the starting NB for 3 NB allocation, and so on, as explained above.

A narrowband can include or can be exactly six physical resource blocks for resource allocation. The narrowband can be a narrowband predetermined for machine type communication (MTC) or enhanced MTC. Thus, the allocated resources may be, for example, physical resource blocks.

In certain embodiments, one of the allocated narrowbands can be only partially allocated while the other allocated narrowbands can be completely allocated. The one of the allocated narrowbands that is partially allocated can be the narrowband that has the lowest or highest index among the allocated narrowbands. The one of the allocated narrowbands that is partially allocated can be continuous to the other allocated narrowbands. The allocated resources in the one of the allocated narrowbands that is partially allocated can be continuous with the other allocated narrowbands.

The indicating at 720 can include indicating indexes of the allocated resources in the one of the allocated narrowbands. Moreover, the indicating at 720 can include indicating the allocated narrowbands including the partially allocated narrowband.

Alternatively, or in addition, the indicating at 720 can include indicating, as a direct indication (e.g. by using the $$\left\lceil \log_2\left\lceil \frac{N_{RB}^{UL}}{6} \right\rceil \right\rceil$$

indication), an index of the narrowband that has the lowest or highest index among the allocated narrowbands. Moreover, the indicating at 720 can include reusing part of a predetermined resource indication field for indicating the allocated resources in the one of the allocated narrowbands. Additionally, the indicating at 720 can include reusing part of a predetermined resource indication field for indicating the other narrowbands allocated to the user equipment in addition to the narrowband that has the lowest or highest index among the allocated narrowbands.

The predetermined resource indication field can be associated with a predefined mapping table indicating which bandwidth allocation is associated with which state of the resource indication field.

A user equipment may, at 730, receive the indication sent at 720. The user equipment can then communicate with the radio network node on the basis of the allocated narrowbands and allocated resources, at 740.

Figure 8:
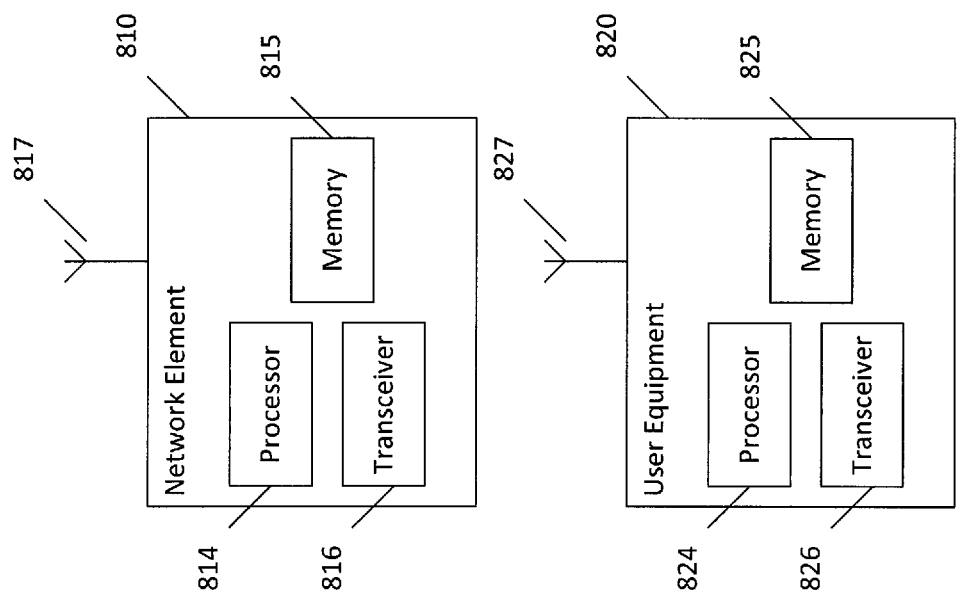
FIG. 8 illustrates a system according to certain embodiments.

FIG. 8 illustrates a system according to certain embodiments of the invention. It should be understood that each block of the flowchart of FIG. 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an evolved Node B (eNB), or any other network element, such as any radio network node.

Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIG. 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIG. 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

In an embodiment at least some of the functionalities of the apparatus 810 of FIG. 8 may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Certain embodiments can provide various benefits and/or advantages. For example, solutions 1 and 2 described above can save resource allocation bits as compared to a Rel.8 method. Moreover, DCI performance can be improved with fewer bits.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations
BL/CE Bandwidth reduced Low complicity or coverage enhancement
FeMTC Further enhanced MTC
NB Narrowband
DCI Downlink control information
DL Downlink
MPDCCH eMTC Physical Downlink Control Channel
UL Uplink

What is claimed is:

1. An apparatus, comprising:
at least one processor; and
at least one memory including computer program code,
wherein the at least one memory and the computer program code are configured to, with the at least one processor, cause the apparatus at least to:
determine a bandwidth for allocation to a user equipment, wherein the allocated bandwidth comprises resources in a single narrowband or in a plurality of narrowbands;
select a state for predetermined part of a resource indication field among a plurality of states, wherein the selection is at least partially based on whether the allocated bandwidth is in the single narrowband or in the plurality of narrowbands; and
indicate to the user equipment the resource indication field based on the selection.

2. The apparatus of claim 1, wherein the at least one memory and the computer program code are configured to, with the at least one processor, cause the apparatus further to:
select a state equal or below a threshold state when the allocated bandwidth is equal to or below a threshold bandwidth, or
select a state above the threshold state when the allocated bandwidth is above the threshold bandwidth.

3. The apparatus of claim 2, wherein the threshold bandwidth is a bandwidth of a single narrowband.

4. The apparatus of claim 2, wherein the threshold state is predefined such that 21 states of five bits comprised in the predetermined part of the resource indication field are available for indicating the allocated bandwidth in the single narrowband and remaining 11 states of the five bits are available for indicating the allocated bandwidth in the plurality of narrowbands.

5. The apparatus of claim 4, wherein the at least one memory and the computer program code are configured to, with the at least one processor, cause the apparatus further to:
in case the allocated bandwidth is in the single narrowband, indicate to the user equipment one state of the available 21 states to indicate allocated resources in the single narrowband.

6. The apparatus of claim 4, wherein the at least one memory and the computer program code are configured to, with the at least one processor, cause the apparatus further to:
in case the allocated bandwidth is in the plurality of narrowbands, indicate to the user equipment one state of the remaining 11 states to indicate allocated resources in the plurality of narrowbands.

7. An apparatus, comprising:
at least one processor; and
at least one memory including computer program code,
wherein the at least one memory and the computer program code are configured to, with the at least one processor, cause the apparatus at least to:
receive, from a radio network node, a resource indication field indicating a bandwidth allocated to the apparatus;
determine a state of a predetermined part of the resource indication field among a plurality of states, wherein the state defines whether the allocated bandwidth comprises resources in a single narrowband or in a plurality of narrowbands;

determine, at least partially based on the state, the bandwidth allocated to the apparatus in the single narrowband or in the plurality of narrowbands; and communicate in accordance with the allocated bandwidth.

8. The apparatus of claim 7, wherein the apparatus comprises a machine type communication user equipment supporting larger than one narrowband allocation.

9. The apparatus of claim 7, wherein each narrowband comprises six physical resource blocks.

10. The apparatus of claim 7, wherein the at least one memory and the computer program code are configured to, with the at least one processor, cause the apparatus further to:

determine that the allocated bandwidth is equal to or below a threshold bandwidth when the state is determined to be equal or below a threshold state, or determine that the allocated bandwidth is above the threshold bandwidth when the state is determined to be above the threshold state.

11. The apparatus of claim 10, wherein the threshold bandwidth is a bandwidth of a single narrowband.

12. The apparatus of claim 10, wherein the threshold state is predefined such that 21 states of five bits comprised in the predetermined part of the resource indication field are available for indicating the allocated bandwidth in the single narrowband and remaining 11 states of the five bits are available for indicating the allocated bandwidth in the plurality of narrowbands.

13. The apparatus of claim 12, wherein the at least one memory and the computer program code are configured to, with the at least one processor, cause the apparatus further to:

determine the allocated bandwidth to be in the single narrowband when the state is determined to be one state of the available 21 states; and determine resources in the single narrowband at least partially based on the determined state.

14. The apparatus of claim 12, wherein the at least one memory and the computer program code are configured to, with the at least one processor, cause the apparatus further to:

determine the allocated bandwidth to be in the plurality of narrowbands when the state is determined to be one state of the remaining 11 states; and determine resources in the plurality of narrowbands at least partially based on the determined state.

15. The apparatus of claim 7, wherein, in case the allocated bandwidth is in the plurality of narrowbands, one of the plurality of narrowbands is only partially allocated while the other narrowbands are completely allocated.

16. The apparatus of claim 7, wherein, in case the allocated bandwidth is in the plurality of narrowbands, the allocated resources in the one of the plurality of narrowbands are continuous with the other narrowbands of the plurality of narrowbands.

17. The apparatus of claim 7, wherein the at least one memory and the computer program code are configured to, with the at least one processor, cause the apparatus further to:

receive an index of the allocated single narrowband, or receive an index of a lowest or highest narrowband of the allocated plurality of narrowbands.

18. The apparatus of claim 17, wherein the at least one memory and the computer program code are configured to, with the at least one processor, cause the apparatus further to:

determine, at least partially based on the state, remaining allocated narrowbands of the plurality of narrowbands, in addition to the narrowband that has the lowest or highest index among the plurality of narrowbands.

19. The apparatus of claim 7, wherein the resource indication field is associated with a predefined mapping table, wherein the predefined mapping table links a given resource allocation among the plurality of narrowbands to a given state of the resource indication field.

20. A method, comprising:

receiving, by a user equipment from a radio network node, a resource indication field indicating a bandwidth allocated to a user equipment;

determining a state of a predetermined part of the resource indication field among a plurality of states, wherein the state defines whether the allocated bandwidth comprises resources in a single narrowband or in a plurality of narrowbands;

determining, at least partially based on the state, the bandwidth allocated to the user equipment to be in the single narrowband or in the plurality of narrowbands; and communicating in accordance with the allocated bandwidth.

* * * * *